Patented June 12, 1928.

1,673,499

UNITED STATES PATENT OFFICE.

GEORGE MALCOLM DYSON, OF MANCHESTER, FREDERICK ALFRED MASON, OF BLACK-LEY, MANCHESTER, AND ARNOLD RENSHAW, OF MANCHESTER, ENGLAND, ASSIGNORS TO BRITISH DYESTUFFS CORPORATION LIMITED, OF MANCHESTER, ENGLAND, A CORPORATION OF GREAT BRITAIN AND IRELAND.

MANUFACTURE AND PRODUCTION OF CARBAZIDES OF THE NAPHTHALENE SERIES.

No Drawing. Application filed May 12, 1927, Serial No. 190,959, and in Great Britain May 25, 1926.

In the specifications of British Letters Patent Nos. 9,472 and 2,192 of 1914, the manufacture of ureas and thioureas of the napthalene series is described; and again in the specification of British Letters Patent No. 224,849, the manufacture of one particular symmetrical urea is described, and this specification refers to a number of British and other patents relating to the manufacture of allied substances. All the patents referred to deal with the production of ureas or thioureas, and nothing is said with reference to the production of carbazides from similar materials, let alone as to the properties possessed by such bodies.

We have found that new carbazides can be obtained as hereinafter set forth which are of value as therapeutic agents for the destruction of blood parasites, although comparatively non-toxic to man and higher animals, and as intermediates for the manufacture of colouring matters.

We have found that by the action of aromatic carboxylic or sulphonic halides which contain in the aromatic nucleus a nitro group upon sulphonated amines or aminophenols of the naphthalene or acenaphthene series, or upon derivatives of these, containing always an .NH. group in the α-position, N-acidyl substituted compounds are obtained, which, after reduction of the nitro group followed by diazotization of the new amino group and reduction of the diazo compound so formed, yield hydrazines, which by treatment with phosgene are converted into the corresponding carbazides. Further we have found that, after reduction of the nitro group as aforesaid, the resulting amino compound, instead of being diazotized and reduced, may be treated with the same nitroaromatic acidyl halide as initially used or with a different nitroaromatic acidyl halide, and the new nitro group may be reduced to give the corresponding amino derivative. By repeating these operations, the amino-acidyl residue can be successively introduced two or more times into the molecule. From these compounds the corresponding carbazides can be produced, as above described, by diazotization, reduction and treatment with phosgene.

As examples of substituents for the production of the substituted naphthylamine sulphonic acids may be mentioned 2-nitro-cinnamyl chloride (Berichte 16, 34, Beilstein 2, 1414, 3rd edition), 3-nitrocinnamyl chloride (German Patents 288,272 and 288,273), 4-nitrocinnamyl chloride (Berichte 1916, 49, 2688), 1-nitro-naphthalene-5-sulpho-chloride, 1:5-nitronaphthoyl chloride, 2-nitrophenylacetyl chloride (Berichte 43, 2547), 4-nitrophenylacetyl chloride, nitrobenzoyl chlorides, nitroanisoyl chlorides, nitrotoluyl chlorides, nitro-benzene sulpho-chlorides, chloro-nitrobenzoyl chlorides, bromonitrobenzoyl chlorides and iodonitrobenzoyl chlorides. As examples of the aminonaphthalene sulphonic acids may be mentioned 1:8-aminonaphthol-3:6-disulphonic acid, 1-naphthylamine-4:8-disulphonic acid, 1-naphthylamine-4:6:8-trisulphonic acid, 1-naphthylamine-3:6:8-trisulphonic acid, chloronaphthylamine sulphonic acid, bromo- or iodo- naphthylamine sulphonic acids (obtained by halogenating naphthylamine sulphonic acids by known methods or by halogenating acetylnaphthylamine sulphonic acids by known methods and hydrolyzing the products, alkoxynaphthylamine sulphonic acids, 1:5-amino-naphthol-7-sulphonic acid and 2:8-aminonaphthol-3:6-disulphonic acid.

As examples of the amino-acenaphthene sulphonic acids may be mentioned 4-amino-acenaphthene-5-sulphonic acid

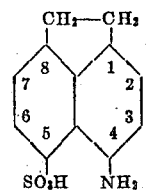

and 4-aminoacenaphthene-3-sulphonic acid (Fleischer & Schranz, Ber. 55, 3253 (1922), G. T. Morgan and V. E. Yarsley, Journal of the Society of Chemical Industry, 44, 513T (1925)), 4-amino-acenapthene-3:5-disulphonic acid (G. T. Morgan and V. E. Yarsley, Journal of the Society of Chemical Industry, 44, 513T (1925)), 4-amino-acenaphthene-trisulphonic acids (obtained by further sulphonation of 4-aminoacenaphthene-5-sulphonic acid with oleum or of 4-nitroacenaphthene-5-sulphonic acid with oleum and reduction of the $NO_2$ group).

The finished product may be purified in any suitable manner, as for instance by solution in methyl or ethyl alcohol, glacial acetic acid, or other suitable solvent, and precipitation of the substance from the solution by acetone, ether or other suitable precipitant.

As an illustration of one method of carrying out our invention we describe below the process for preparing a compound having the probable structure:

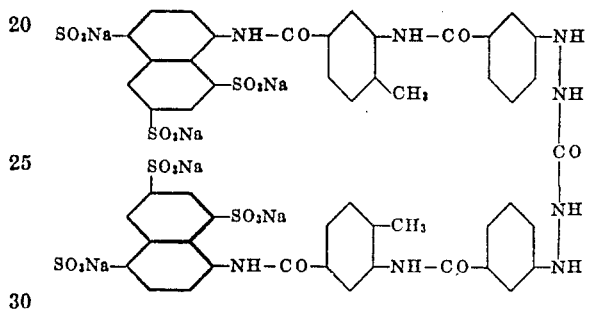

Our invention is in no way limited to the substances mentioned in this example nor to the proportions there used, nor to the details of the method of preparation given. The parts are parts by weight.

*Example.*

122 parts of 1-naphthylamine-4:6:8-trisulphonic acid are stirred into 600 parts of water and made just alkaline with caustic soda. 100 parts of sodium acetate and 50 parts of *o*-nitro-*p*-toluyl chloride are added. After being stirred until free amino group can no longer be detected, the solution is filtered and reduced at the boil with 100 parts of iron, 150 parts of water and 20 parts of 10% hydrochloric acid. The mixture is made alkaline with soda ash, filtered and cooled. 50 parts of *m*-nitrobenzoyl chloride are now added, and after stirring for 24 hours the whole is heated to 80° C. and filtered. The product is salted out from the filtrate, washed with brine, pressed, re-dissolved in 900 parts of hot water, and reduced as before with iron, water and a little acid. Soda ash is added, iron sludge is removed by filtration, the filtrate is made neutral to litmus and evaporated under reduced pressure to half its volume. 110 parts of salt are added, and after filtering off impurities and making alkaline once more with soda ash, colourless crystals of sodium aminobenzoylaminotoluylaminonaphthalenetrisulphonate separate out on standing.

96 parts of this product are dissolved in 300 parts of water and made acid to Congo paper with dilute hydrochloric acid. Ice is added to reduce the temperature to 0° C. and the solution is diazotized with 140 parts of 10 per cent hydrochloric acid and 8.8 parts of sodium nitrite in aqueous solution. The diazo compound is reduced with 64 parts of sodium hydrosulphite dissolved in water. When reduction is complete, the solution is heated to boiling for a short time to hydrolyze the hydrazinesulphonic acid, and the cooled solution is then carefully neutralized with alkali and evaporated to dryness (preferably under reduced pressure). The solid product is extracted with methyl alcohol and the filtrate poured into 5-6 times its bulk of absolute ethyl alcohol. The precipitate is the purified hydrazine derivative. 63 parts of this product are dissolved in 200 parts of water with the addition of 30 parts of sodium carbonate. A solution of phosgene in toluene is added in portions with stirring until 30 parts of phosgene have been used up. The aqueous layer is then separated, carefully neutralized with 10 per cent hydrochloric acid, and evaporated to dryness under reduced pressure. The methyl alcohol extract of the solid product is poured into ethyl alcohol and yields the carbazides in the form, when dried, of a pale red powder. Acidyl residues are intended to include the carbonyl (CO) and sulphonyl ($SO_2$) complexes.

What we claim and desire to secure by Letters Patent is:—

1. As new materials the carbazides having the general formula

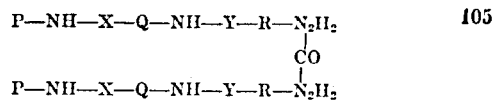

in which X and Y are acidyl residues, P represents a sulphonated monovalent aromatic residue containing more than one fused ring and derived from a hydrocarbon having a molecular weight of more than 120 and less than 160, and Q and R represent divalent aromatic residues containing not more than two cyclic nuclei, the said carbazides being white or pale coloured powders, soluble in aqueous alkali and hydrolyzed when boiled with caustic alkali, forming an alkali carbonate and a hydrazine, P—NH—X—Q—NH—Y—R—$N_2H_2$.

2. As new materials carbazides having the general formula

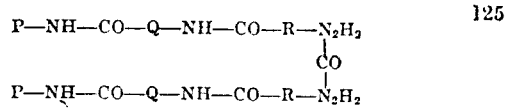

in which P represents a naphthalene residue containing more than one fused ring and derived from a hydrocarbon having a molecular weight of more than 120 and less than 160, and Q and R represent divalent aromatic residues containing not more than two cyclic nuclei, the said carbazides being

P—NH—CO—Q—NH—CO—R—N₂H₂ and eventually the constituent amines

P—NH₂COOH—Q—NH₂ and the hydrazine

COOH—R—NH—NH₂.

3. As new materials carbazides having the general formula

P—NH—CO—Q—NH—CO—R—N₂H₂
                              |
                              CO
                              |
P—NH—CO—Q—NH—CO—R—N₂H₂ in which P represents a sulphonated naphthalene residue containing more than one fused ring and derived from a hydrocarbon having a molecular weight of more than 120 and less than 160, and Q and R are monocyclic aromatic residues.

4. As new materials carbazides having the general formula

P—NH—CO—Q—NH—CO—R—N₂H₂
                              |
                              CO
                              |
P—NH—CO—Q—NH—CO—R—N₂H₂ in which P represents a sulphonated naphthalene residue containing more than one fused ring and derived from a hydrocarbon having a molecular weight of more than 120 and less than 160, and Q is a tolylene residue and R is a monocyclic aromatic residue.

5. As new materials carbazides having the general formula

P—NH—CO—Q—NH—CO—R—N₂H₂
                              |
                              CO
                              |
P—NH—CO—Q—NH—CO—R—N₂H₂ in which P represents a sulphonated naphthalene residue containing more than one fused ring and derived from a hydrocarbon having a molecular weight of more than 120 and less than 160, Q is a tolylene residue and R is a phenylene residue.

6. As new materials carbazides having the general formula

P—NH—CO—Q—NH—CO—R—N₂H₂
                              |
                              CO
                              |
P—NH—CO—Q—NH—CO—R—N₂H₂ in which P represents a sulphonated naphthalene residue containing more than one fused ring and derived from a hydrocarbon having a molecular weight of more than 120 and less than 160, Q is the 2:4-tolylene residue (CH₃=1) and R is a phenylene residue.

7. As new materials carbazides having the general formula

P—NH—CO—Q—NH—CO—R—N₂H₂
                              |
                              CO
                              |
P—NH—CO—Q—NH—CO—R—N₂H₂ in which P represents a trisulphonated naphthalene residue containing more than one fused ring and derived from a hydrocarbon having a molecular weight of more than 120 and less than 160, Q is the 2:4-tolylene residue (CH₃=1) and R is a phenylene residue, the final fission products being a naphtylamine trisulphonic acid, 3-amino-4-methylbenzoic acid and aminophenyl hydrazine.

8. As a new material the substance having the probable formula

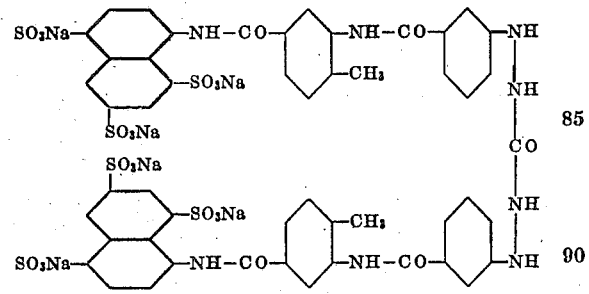

the said substance being a white powder, readily soluble in water and dissolving in 10 per cent aqueous caustic soda to a red solution which becomes gradually yellow when boiled, the yellow solution showing the characteristic reducing power of a hydrazine towards ammoniacal copper sulphate and ammoniacal silver solutions.

In testimony whereof we affix our signatures.

GEORGE MALCOLM DYSON.
FREDERICK ALFRED MASON.
ARNOLD RENSHAW, M. D.